Feb. 13, 1968  A. S. NORCROSS  3,368,390
VISCOSITY MEASURING APPARATUS
Filed June 4, 1965  2 Sheets-Sheet 1

INVENTOR.
Austin S. Norcross
BY Roberts, Cushman & Grover
ATT'YS.

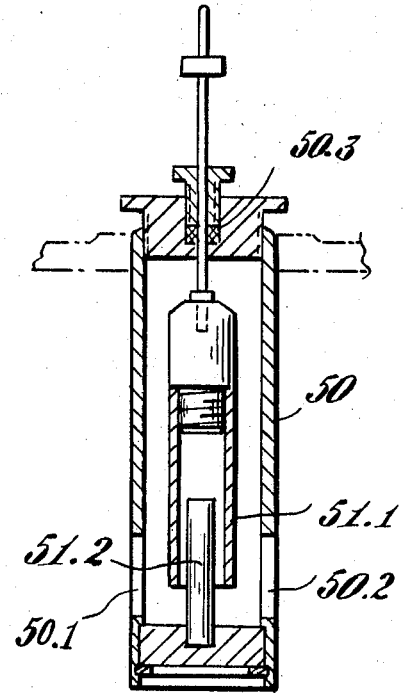

Fig. 2

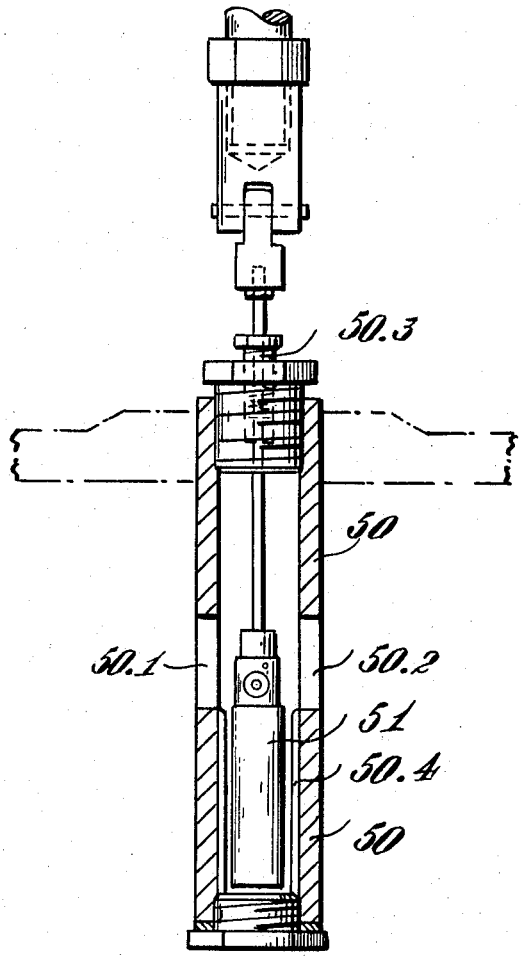

Fig. 3

| COMPONENT | CYCLES OF OPERATION → | | |
|---|---|---|---|
| CHART MOTOR 11 | RUNS CONTINUOUSLY | | NEXT CYCLE |
| TIMER MOTOR 21 | RUNS CONTINUOUSLY | | |
| TIMER { CONTACT 25 | OPEN | CLOSED | |
| { CONTACT 26 | CLOSED FOR 30" | OPEN | |
| VALVE 41 | AIR TO LEFT OF 45 | AIR TO RIGHT OF 45 | |
| MEASURING MOTOR 31 | RUNS ↻ \| STOPS | RUN ↺ \| STOPS | |
| LOW LIMIT SWITCH 36 | CLOSED \| OPENS | | |
| HIGH LIMIT SWITCH 39 | CLOSED | | OPENS IF PEN FULL UP |
| PISTON 51 | RAISING | FALLING | |
| CIRCUIT BREAKER 59 | CLOSED | OPENS | |
| PEN 14 | LAST READ'G. | UP, OR FALLING | |
| CLUTCH/BRAKE 15, 28 | IN | | OUT |

Fig. 4

United States Patent Office 3,368,390
Patented Feb. 13, 1968

3,368,390
VISCOSITY MEASURING APPARATUS
Austin S. Norcross, Newton, Mass., assignor, by mesne assignments, to Norcross Corporation, Newton, Mass., a corporation of Massachusetts
Filed June 4, 1965, Ser. No. 461,278
13 Claims. (Cl. 73—56)

ABSTRACT OF THE DISCLOSURE

In a viscometer of the type wherein a cylinder and a piston form a gap and relative movement of cylinder and piston measures viscosity by the shearing of the fluid being tested, either cylinder or piston is positively driven by motor means whose speed is sensitive to the shearing force, for example a hydraulic piston engine. The time needed by the driven element to traverse a given stroke length is a measure of viscosity during respective strokes. The positively driven detecting component is particularly useful for continuous measurement when cyclically driven within continuously or periodically changed fluid.

---

The field of this invention is that of measurement of the viscosity of fluids by forcing the fluid whose viscosity is to be measured through a restricted orifice by a moving body. The duration of a predetermined movement of such body in the fluid is used as a measure of the viscosity, suitable indicating means being responsive to such duration of movement of the body.

Viscosity measuring devices of this general class are described in my copending applications Ser. Nos. 344,892 and 344,894 of Feb. 14, 1964, now Patents Nos. 3,304,-765, dated Feb. 21, 1967 and 3,290,923, dated Dec. 13, 1966, respectively, and in my Patent No. 2,491,389 of Dec. 13, 1949.

Objects of the invention are to provide a viscometer that can make measurements in rapid succession so as closely to reflect changing viscosities, that is relatively independent of the pressure of the fluid, that is relatively independent of the density of the fluid, the orifice and moving body of which can be mounted in any position, including a position in which the moving body moves horizontally, and which can be easily adjusted for operation with different shear values while using the same time scale on the recording chart.

The substance of the invention can be briefly summarized as involving in one aspect driving the moving body, at least during the measuring stroke, by liquid or gaseous fluid-actuated reciprocating means having its speed sensitive to the resistance offered by the fluid. In another aspect the invention involves using a relatively thin rod for driving the moving body, with the result of nearly equalizing the static forces exerted by the fluid upon opposite sides of the moving body, and the further result of reducing friction loss at the stuffing box, thus permitting the moving body to run easily in fluids under pressure and to operate nearly independently of variations in pressure.

These and other objects, advantages and inventive aspects of the invention will appear from the following description of its principles, mode of operation and of practical embodiments thereof.

The description refers to drawings in which:

FIGS. 2 and 3 are central sectional views showing alternate constructions of moving bodies and their associated parts, for use in the system of FIG. 1; and FIG. 4 is a cycle of operation chart indicating the operation of components of the apparatus of the system of FIG. 1.

Figure 1:
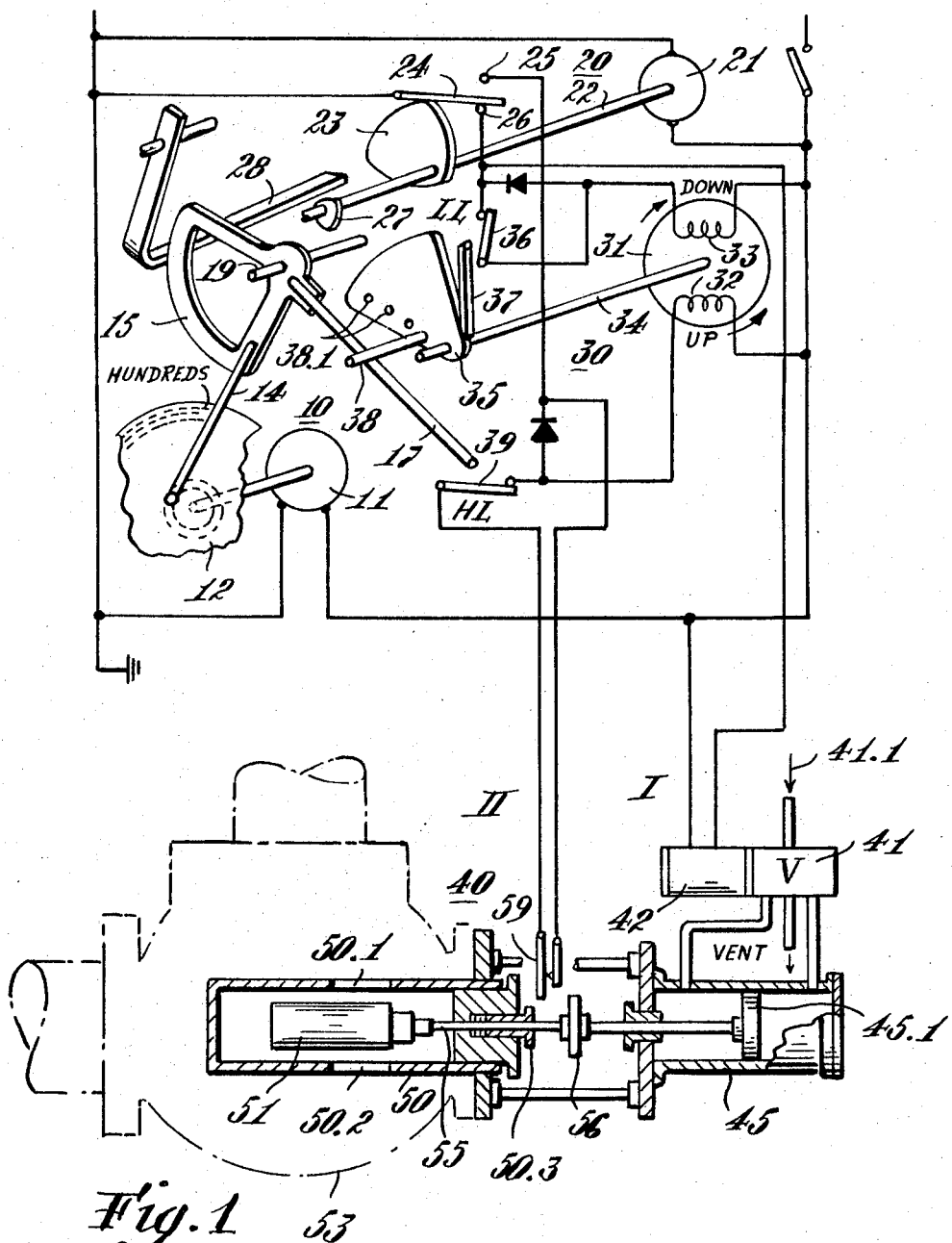
FIG. 1 is a schematical representation of a viscometer apparatus having certain points of similarity to the systems disclosed in my said copending applications and embodying detecting apparatus according to the present invention.

The system shown in FIG. 1 has an indicating component occupying generally the upper part of this figure, joined by circuitry links I and II to a detecting component occupying generally the lower part of this figure. While the indicating unit and the linkage are described in my said copending applications, a brief description of these should be helpful to an understanding of the way in which the detecting or measuring component is controlled and the duration of a predetermined travel of its moving body is translated into an indication or record of the viscosity of the fluid.

The INDICATING COMPONENT or station has a chart unit 10 with a motor 11 for driving a chart 12 of conventional circular configuration. The indicator means proper comprise here a recording pen 14, mounted on a clutch and brake segment 15 which is rotatably mounted on a fixed shaft 19. The segment 15 also has attached thereto a pen actuating follower 17 which is also capable of opening the normally closed full scale limit switch 39, herein also referred to as a high limit switch.

A timer unit 20 has a timer motor 21 conveniently supplied from the same power line as the chart motor 11 and driving, by means of shaft 22, a cam 23 arranged to transfer during a predetermined period, beginning with a given angular position thereof, the contact or switch arm 24 from normally closed position on contact 26 to operating position on contact 25. The shaft 22 also carries a clutch operating cam or similar instrumentality indicated at 27 capable of lifting in a predetermined angular position at the end of each measuring cycle, the brake and clutch arm 28 from the segment 15, for the purpose of momentarily releasing the clutch to allow the pen to return, by gravity, spring or other biasing, to a lower position unless it is held by the pin 38, as will be described below.

A measuring unit 30 has a measuring motor 31 of the type which can be selectively operated in either direction by means of separate windings here designated as up-winding 32 and as down-winding 33. The motor 31 drives a shaft 34 which carries a range selector plate 35 with a switch operator 37 which in a given angular position of the plate opens a normally closed low limit switch 36, in the circuit of the down-winding 33 in series with the normally closed contacts 24, 26. An actuator pin 38 for operating the above-mentioned follower 17 can be placed in various range selecting positions upon the range selector plate 35, as indicated by perforations 38.1 for placing the pin 38 at various radii from the shaft 34 to move the follower 17 at preselected speeds. As indicated in FIG. 1, the switches which control the windings of motor 31 are bridged by rectifiers in well-known manner to stop this motor quickly by energizing the corresponding winding with direct current. The measuring motor 31 is capable of lifting the pen 14 by way of the pin 38, against the frictional torque applied by the brake and clutch arm 28 to the segment 15. This frictional torque between segment 15 and arm 28, while it can be overcome by the torque exerted by the measuring motor, is capable of holding the pen in viscosity indicating position, until the next measurement lowers or raises its reading, as will be described below. The so-called high limit switch 39 stops the measuring motor by energizing the upcoil 32 with direct current, when the pen has reached full scale such as "hundred" reading, in order to prevent over-running. It should be understood that the designations "up-coil" and "down-coil" for 32, 33, respectively, refer to gravity biasing of plate 35 and segment 15, and hence to up and down movement of the pen.

The DETECTING COMPONENT or station 40 shown in the lower part of FIG. 1 has a fluid receiving cylindrical vessel 50 containing a moving body such as a piston 51 fitting it with a predetermined viscosity responsive clearance. As well known, the clearance between the wall of the vessel such as 50 and the body such as piston 51 moving relatively thereto, constitutes a measuring gap whereby the viscosity of a fluid can be measured by its shearing during the relative movement. The clearance gaps have orders of magnitude of from one hundredth to less than one-ten thousandths of an inch. Fluid samples whose viscosity is to be measured can be periodically supplied to the vessel 50 by any convenient means such as indicated by the container 53 from which fluid is admitted into and removed from the vessel 50 through openings 50.1, 50.2 in vessel 50. The piston rod 55 for the moving body is appropriately guided in a stuffing box 50.3 in the head wall of vesesl 50, the stuffing box closing the vessel 53 against loss of pressure.

Piston rod 55 is connected by a suitable coupling 56 to the piston rod 57 of a pneumatic motor 45 outside of the vessel 53. Motor 45 functions to force the moving body piston member 51 through the fluid during the measuring stroke. A feature of the motor is that, at least in the measuring stroke, its speed is sensitive to the resistance offered by the fluid whose viscosity is being measured. Thus the moving body moves faster when the viscosity is lower and moves slower when the viscosity is higher. A pneumatic motor having a suitable supply of compressed air under constant pressure is preferred, but other fluid, including liquid, actuated motors can be constructed to have a speed suitably sensitive to the resistance.

The motor is preferably reversible so as to function also as a means of restoring the moving body to position for starting a new measuring stroke.

Thus in the preferred embodiment shown the motor 45 has air conduits leading to its cylinder on opposite sides of its piston 45.1, these conduits extending from a combined control and vent valve 41 receiving compressed air at 41.1 and controlled by a solenoid 42. The solenoid is connected by linkage wire I to contact 26 of the switch 24, 26. Energizing the solenoid through contact 26 and linkage wire I will vent the right side of the motor cylinder and supply air to the left side, this being the condition when the moving body is being restored (moved to the right in FIG. 1) and is being held in its right-hand position in readiness for a measuring stroke. Then when switch 24, 26 transfers to close contact 25 and energizes the up-winding 32 of the measuring motor, solenoid 42 will de-energize, allow the valve 41 to shift so as to vent the left side of the motor cylinder and apply compressed air to the right side. The moving body 51 is thereby forced through the fluid during the measuring stroke. At the end of the measuring stroke the coupling 56 strikes and opens a circuit breaker 59 in link II, stopping the measuring motor.

The resistance offered by the fluid in vesesl 50 to the movement of the moving body through it determines the speed with which this movement is effected by the motor 45 and hence determines the duration of the measuring stroke. This duration is taken as a measure of viscosity.

Driving the moving body by a fluid-actuated motor frees the device from any necessary reliance upon acceleration of gravity to move the moving body through the fluid, and also frees the device from any necessary reliance upon difference in density between the fluid and the moving body.

Thus the moving body can be brought to a desired speed more quickly than when the acceleration of gravity must be relied upon.

Moreover, by eliminating reliance upon gravity, the density of the fluid becomes unimportant. It can be seen that with the classical falling ball viscometer the force moving the ball is a function of the difference between the density of the ball and the density of the fluid, i.e., the ball more nearly floats if the fluid is dense, and hence sinks more slowly. In comparing the viscosities of fluids which may have different densities, the classical falling body viscometer thus confuses density and viscosity, whereas by eliminating reliance upon gravity the present invention is able to eliminate the density factor and to make correct viscosity comparisons between fluids of different densities.

The measuring stroke of the body 51, which is from right to left in FIG. 1, is started by the transfer of the switch arm 24 from contact 26 to contact 25. This energizes the up-winding of the measuring motor and de-energizes the solenoid 42, applying compressed air to the right side of the cylinder of motor 45 and driving the body 51 to the left. Upon a predetermined travel of the body 51 the coupling 56 strikes and opens the circuit breaker 59, de-energizing the up-winding of the measuring motor. The cam 23 transfers the switch arm 24 back to the contact 26, energizing the solenoid 42 to cause the valve 41 to apply compressed air to the left side of the cylinder 45 and vent the right side, restoring the body 51 to the right end of its vessel.

The SYSTEM OPERATION is comprehensively set forth in FIG. 4 and needs little further explanation beyond the following comments pertaining particularly to the circuitry.

Assuming that the apparatus is in the condition at the beginning of the period charted in FIG. 4, the body cycling means which includes motors 21 and 31 with the switches pertaining thereto, causes the moving body 51 to be restored to the right and the measuring motor 31 with plate 35 and pin 38 to return to initial position, with the contacts 24, 26 closed and solenoid 42 energized. When the timing means 20 transfers contact 24 to 25, the measuring begins, initiated through linkage I de-energizing solenoid 42. The up-winding controlled measuring motor 31 rotates pin 38 downwardly, progressively increasing the indication made by the pen 14, until the moving body 51 reaches a predetermined position, where the coupling 56 opens the circuit breaker 59 by way of link II the motor 31 is stopped. Assuming first that the preceding viscosity measurement was lower, the pin 38 abuts, during the measuring period while motor 31 is running, the follower 17 which in turn rotates the segment 15 with pen 14. As indicated above, the driving torque of the segment 15 overcomes the frictional torque applied by the brake arm 28 and the pen 14 advances on the chart to the value corresponding to the viscosity of the sample just having been measured. Assuming on the other hand that the preceding viscosity measurement was higher and the pin 38 has not advanced as far as during the preceding cycle, the segment 15 is permitted to rotate towards a lower reading of the pen at the end of the measuring cycle when cam 27 momentarily releases the brake arm 28, as described above. It will now be evident that this lower reading is determined by the position of pin 38 at the time when the measuring motor is stopped by the opening of link II at the end of the measuring period.

The pin 38 may be referred to as having an indicating movement while it is being moved downwardly in FIG. 1 by the up-winding 32 even in those cases in which, because of a higher previous reading, the pen 14 does not assume a position corresponding to that of the pin 38 until the brake 28 is released. The movement of the pin 38 in the opposite direction by the down-winding 33 may be referred to as its restoring movement.

The up-winding 32 is energized simultaneously with admission of air to the right side of the cylinder of motor 45, so the measuring movement of body 51 and the indicating movement of the pin element 38 begins simultaneously. Similarly the restoring movements of the body 51 and the pin element 38 begin simultaneously. These operations are controlled by the timing cam 23 acting through the switch arm 24. The switch arm 24 controls the solenoid 42 and piston-controlling valve 41, as well as the up-winding and the down-winding of the motor 31. The low limit switch 36 opens at the end of the down movement of motor 31, stopping plate 35 in a position corresponding to zero indication of the pen if it were fully released. This is the setting for normal operation, but for purposes of measuring with a so-called "suppressed zero," the position of plate 35 can be changed to permit the motor to go below the zero reading. The high limit switch 39 opens when the pen is in uppermost, full scale position.

Although there will be occasions when it is desirable to mount the device for movement of the moving body in a horizontal direction as in FIG. 1, the movement may be in a vertical direction as in FIGS. 2 and 3.

In FIG. 2 the moving body is shown by way of example as a hollow moving cylinder 51.1 cooperating with an interior stationary piston or mandrel 51.2 as in my copending application for Apparatus for Measuring Viscosity, filed concurrently herewith. In that case the measuring orifice is the annular space or gap between cylinder and mandrel. This space or gap may amount to for example from approximately 0.075 inch to 0.001 inch, depending upon the range of viscosities of the fluid to be measured.

In FIG. 3 the moving body 51 is shown similar to FIG. 1, as a closed or solid cylinder as in my said Patent No. 2,491,389. In that case the measuring orifice is the annular space or gap between the moving body, and a stationary cylindrical liner 50.4 within the vessel 50.

In either case the piston rod 55 is made, in accordance with an important feature of the invention, quite thin in comparison to the moving body, such as not more than approximately one-fourth the diameter of the moving body. For that one-fourth ratio of diameters, the area presented by the face of the piston in moving in its measuring stroke will be sixteen times the cross-sectional area of the piston rod.

The viscometer will often be used in measuring the viscosity of a fluid which is itself under pressure, which pressure may vary during a processing or manufacturing cycle. Thus, the pipe coupling 53 to which the device is shown as applied in FIG. 1 may be part of a pressurized system whose interior pressure will be applied to the moving body and that part of the piston rod which is within the vessel 50.

There will thus be a force tending to expel the piston rod from the vessel 50. This expelling force consists of the product of the interior pressure and the difference between the areas of the oppositely directed faces of the piston. Thus, the cross-sectional area of the piston rod will correspondingly reduce the area of one piston face below that of the opposite piston face. By having the diameter of the piston rod not more than approximately one-fourth the diameter of the piston, the face of the piston opposite to the piston rod will present an area at least sixteen times the cross-sectional area of the piston rod, and the difference between the areas of the two piston faces will become unimportant and the force tending to expel the piston rods will become minimal. This is particularly advantageous in improving sensitivity of the air-operated motor speed to resistance of the fluid whose viscosity is being measured.

Moreover, the small diameter of the piston rod is helpful in reducing friction loss between the piston rod and the packing at the stuffing box. This friction loss varies as the product of the interior pressure and the rod diameter. Hence the friction loss is less with the small diameter rod than with a more conventionally dimensioned rod.

Since both the expelling force and the friction loss tend to increase as either interior pressure or rod diameter are increased (other factors being held constant) variations of both expelling force and friction loss with changes in interior pressure are minimized by keeping rod diameter small. The device is thereby rendered insensitive to changes in the pressure of the fluid whose viscosity is being measured.

It will be evident that in considering the area of the lower face of the body or piston 51.1 of FIG. 2 the area is the same as though the piston or body were not hollow, i.e., it is computed from the outside diameter, disregarding the inside diameter.

The positive drive of the measuring body with predeterminable force according to the invention permits an advantageous mode of operation not otherwise available. The range of the measuring scale in terms of time, of an instrument of the present type, will be proportionate to the shear strength of the fluid measured at the detecting gap, and the shear depends on the gap dimension, that is the clearance between cylinder and piston. A given substance may measure with different viscosities at different shears, and it is sometimes desirable to measure the same product at different shears with different gaps. Heretofore it was for that purpose necessary to shift the recording scale together with the shear determining gap. The gap can be fairly easily varied by changing the cylinder liner or the moving body, or both. However, corresponding change of the recording scale is cumbersome. This detriment is overcome according to the invention by changing the operating pressure of the moving body together with the shear, a higher pressure overcoming a higher shear with approximately unchanged time increments of relative movement. In a system according to, or analogous to FIG. 1, it is fairly easy to adjust the operating pressure at valve 41, motor 45, and piston 51 in such a manner that the viscosity readings at different shears will be based on the same time scale so that the same detecting set up can be used for different gaps.

It should be understood that the present disclosure is for the purpose of illustration only and that this invention includes all modifications and equivalents which fall within the scope of the appended claims.

I claim:
1. Viscosity measuring apparatus of the type wherein a body forms a measuring gap with a wall of a second body and moves relatively to the wall, whereby the viscosity of a fluid can be measured by its shearing during strokes in a given direction moving against and dependent upon shear resistance offered by the fluid and wherein time responsive means measure viscosity in terms of duration of strokes of relative movement of given length, comprising:
   motor means whose speed is sensitive to said shear resistance, for imparting said measuring movement to said body; and
   means for actuating the time responsive means in response to the speed of the motor.

2. Apparatus according to claim 1 in which the body moves through the fluid being measured in a substantially horizontal direction, whereby the relation between the densities of the moving body and the fluid is substantially without effect upon the duration of the movement.

3. Apparatus according to claim 1 for measuring the viscosity of a fluid in a pressurized vessel, wherein said means for imparting said viscosity dependent movement to the body include a reciprocating rod moving the body in the fluid and extending out through a wall of the vessel, the area presented by the face of said body in the direction of its viscosity dependent movement being approximately at least 16 times the cross-sectional area of said rod.

4. Apparatus according to claim 1 in which said motor means is reversible to restore said moving body following the measuring stroke, to a predetermined starting position.

5. Viscosity measuring apparatus according to claim 4, wherein said time-responsive means includes:
a movable element,
two-directional driving means for the movable element for indicating movement thereof in one direction and restoring movement thereof in the opposite direction,
timing means for alternately rendering said two-directional driving means effective in opposite directions, and
valve control means under control of said timing means for operating the motor to drive the body in its viscosity dependent movement conincidentially with the drive of said movable element in its indicating movement.

6. Apparatus according to claim 4, wherein the moving body is cyclically driven by the motor means with strokes of constant length, in continuously supplied fluid, the time responsive means being cyclically actuated.

7. Viscosity measuring apparatus according to claim 1, wherein the time responsive means includes a movable element, means for driving said element in an indicating movement, and means for starting said indicating movement, and which apparatus further comprises electrically controlled means for applying fluid under pressure to said motor to start said viscosity dependent movement of the body substantially simultaneously with the start of said indicating movement.

8. Apparatus according to claim 7 wherein the time-responsive means has a movable element and means for driving the movable element through an indicating movement in one direction and through a restoring movement in the opposite direction, and which apparatus further comprises timing means for simultaneously initiating operation of the element driving means and of the piston control means.

9. Apparatus for measuring the viscosity of fluid, comprising:
a hollow body;
a cylindrical body forming a measuring gap with said hollow body;
fluid-actuated reciprocating means for forcibly moving said bodies relatively to each other through fluid in said gap at a speed which is in one direction sensitive to the resistance offered by said fluid to said movement; and
time-responsive means responsive to the duration of a movement of predetermined length of said body in said direction.

10. Apparatus according to claim 9 wherein said reciprocating means includes a reciprocating rod attached to one of the bodies, and wherein the area presented by the face of said one body in said direction is at least 16 times the cross-sectional area of said rod.

11. Apparatus according to claim 9 wherein one of the bodies is a stationary mandrel and the other body is a hollow cylinder surrounding the mandrel, the reciprocating means being attached to the hollow cylinder.

12. Apparatus according to claim 9 wherein one of the bodies is a stationary hollow cylinder and the other body is a piston within the hollow cylinder, the reciprocating means being attached to the piston.

13. Viscosity measuring apparatus comprising:
a vessel adapted to contain fluid under pressure,
a closure element adapted to close a passage into said vessel,
a piston rod movable in and out through said closure element,
a movable body forming with a wall of the vessel a gap capable of measuring the viscosity of the fluid in terms of shearing resistance offered by the fluid within the vessel, the area presented by the face of the body in the direction of its viscosity dependent movement being approximately at least 16 times the cross-sectional area of said rod,
time-responsive means responsive to duration of said movement, and
driving means for the piston rod outside of the vessel.

References Cited
UNITED STATES PATENTS

| | | | |
|---|---|---|---|
| 1,270,800 | 7/1918 | Edgecomb | 73—54 |
| 1,529,811 | 3/1925 | Priest | 73—56 |
| 2,209,755 | 7/1940 | Beale | 73—57 |
| 2,503,660 | 4/1950 | Exline et al. | 73—56 |

DAVID SCHONBERG, *Primary Examiner.*